S. M. Kirk & E. J. Howlett.

PAPER BAG MACH.

No. 4,029. Reissued Jun. 14, 1870.

Witnesses
W. A. A. McKinlay
Wm Burns

George Harding
Atty.

United States Patent Office.

EDWIN J. HOWLETT, OF PHILADELPHIA, PENNSYLVANIA, ASSIGNEE OF HIMSELF AND SUSAN KIRK.

*Letters Patent No.* 63,342, *dated February* 26, 1867; *reissue No.* 3,718, *dated November* 9, 1869; *reissue No.* 4,029, *dated June* 14, 1870.

IMPROVEMENT IN TOOL FOR MANUFACTURING PAPER BAGS.

The Schedule referred to in these Letters Patent and making part of the same.

*To all whom it may concern:*

Be it known that EDWIN J. HOWLETT, of Philadelphia, Pennsylvania, and SUSAN M. KIRK, of Camden, New Jersey, did invent an Instrument for Facilitating the Manufacture of Paper Bags; and I do hereby declare the following to be a full, clear, and exact description of the same, reference being had to the accompanying drawing and to the letters of reference marked thereon.

The invention consists of an instrument, fully described hereafter, whereby the closing of the ends of paper tubes, and the conversion of the same into paper bags, is facilitated.

In order to enable others to make and use said invention, I will proceed to describe its construction and operation.

On reference to the accompanying drawing, which forms part of this specification—

Figure 1:
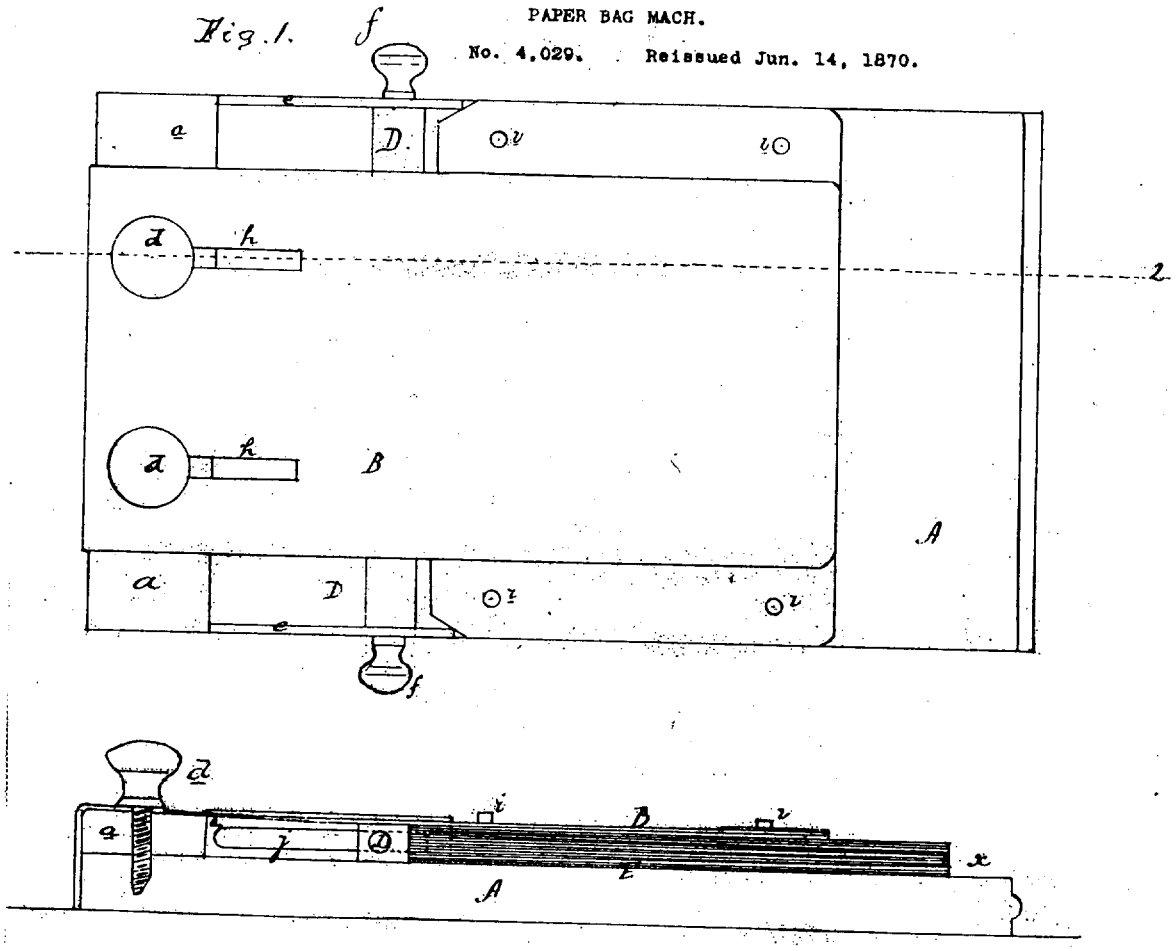
Figure 1:
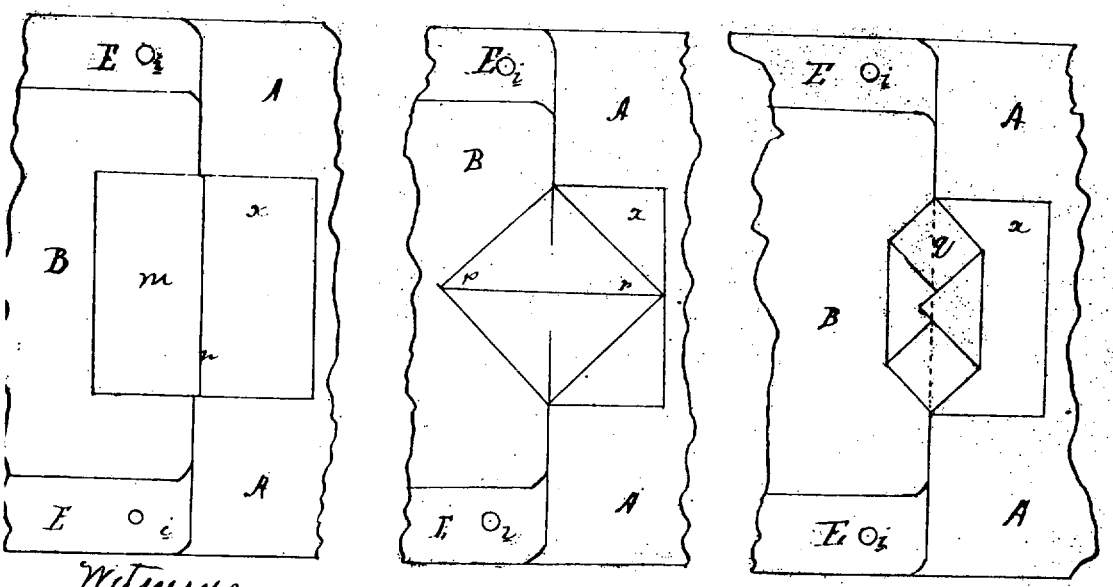

Figure 1 is a plan view of the instrument for facilitating the manufacture of paper bags;

Figure 2, a section on the line 1 2, fig. 1; and

Figures 3, 4, and 5, diagrams, illustrating the manner of using the instrument.

Similar letters refer to similar parts throughout the several views.

A represents a plain flat board, to the upper surface of which, near one end, is secured a transverse strip, *a*, and to the top of the latter is secured a blade, B, by set-screws *d*, the stems of the latter passing through elongated openings in the blade, which is made of thin elastic metal, or other suitable material, its outer end tending to bear on the board A.

On each edge of this board, and near the strip *a*, is a vertical plate, *e*, each plate having an elongated opening, *j*, through which passes a set-screw, *f*, into the end of the strip D, so that, after loosening these screws, the said strip can be adjusted on the board A, to or from the strip *a*, at pleasure, and secured after adjustment.

A plate, E, is illustrated in the drawing as occupying a position beneath the blade B, but this plate is not necessary, excepting in the absence of the blade, and when used in the manner and under the circumstances described hereafter.

The instrument is employed in the following manner for aiding the operator in closing the bottom of paper bags:

Several tubes of paper, open at both ends, and flattened into a compact layer, are placed evenly, one above another, as shown at *x*, fig. 2, on the board A, beneath the blade B, the layer at one end bearing against the strip D, which has been so adjusted that the opposite end of the layer shall project a given distance beyond the outer end of the blade.

The operator now takes the projecting end of the uppermost of the tubes of paper, and turns it over, and presses it against the upper surface of the plate, as seen at *m*, fig. 3, the fold having an edge, *n*, determined by the end of the plate.

The folded portion is now elevated, the tube of paper stretched laterally and pressed down, so as to assume the form represented in fig. 4.

The corners *p p* are now folded, as seen in fig. 5, and the folds pasted, thus completing the bottom of the bag, which is again folded on the dotted line *q*, after which the entire bag is withdrawn from beneath the blade B, and placed upon a layer of previously-completed bags, and submitted to a moderate pressure.

Tube after tube of the layer beneath the blade is thus treated, with that rapidity which could not be effected without the aid of the above-described instrument.

When larger or shorter bags are required, the strip D is so adjusted that no more of each tube shall project beyond the end of the blade than is absolutely necessary for making the folds described.

If the openings in the blade B, for the admission of the screw *d*, are made of sufficient length to allow the blade to be adjusted longitudinally, the strip D may be dispensed with, the front of the stationary strip *a* in this case serving as a guide against which to adjust the tubes of paper, and the adjustable blade serving to determine the extent of the projection of the tubes beyond the outer end of the said blade.

A simple plate, E, may be used in place of the blade, the plate being maintained in one position, laterally and longitudinally, by guiding-pins *i*, which permit it to be elevated, so that a layer of flattened paper tubes may be placed beneath it, the tubes in this case being folded over the front edge of the plate, and the bar D determining the extent of the fold, and the plate or blade B may be fixed, if desired, at its rear end, instead of adjustable.

What is claimed as the invention of EDWIN J. HOWLETT and SUSAN M. KIRK, and sought to be secured by Letters Patent, is—

1. The construction of the board A, blade B, and adjustable strip D, the whole being arranged substantially in the manner described.

2. The combination of the board A, strip *a*, and blade B.

3. The combination of a board, A, with a blade, B, secured substantially as described.

4. The combination of the board A, the guide-plate E, and adjustable strip D.

EDWIN J. HOWLETT.

Witnesses:

JNO. P. ONDERDONK,

E. IRVIN SCOTT.